J. W. BIRKETT.
Stop-Cocks.

No. 142,763.

Patented September 16, 1873.

Witnesses.
Alf. Westbrook
Arnold Hormann

Inventor,
James W. Birkett
by his attorney
F. S. Stetson

AM. PHOTO-LITHOGRAPHIC Co. N.Y. (OSBORNE'S PROCESS)

UNITED STATES PATENT OFFICE.

JAMES W. BIRKETT, OF BROOKLYN, NEW YORK, ASSIGNOR TO HENRY M. BIRKETT, OF SAME PLACE.

IMPROVEMENT IN STOP-COCKS.

Specification forming part of Letters Patent No. 142,763, dated September 16, 1873; application filed May 17, 1873.

*To all whom it may concern:*

Be it known that I, JAMES W. BIRKETT, of Brooklyn, Kings county, in the State of New York, have invented certain Improvements in Stop-Cocks, of which the following is a specification:

The improvement provides more conveniently and efficiently than heretofore for locking or securing the plug of the cock in a closed condition, when desired. It is especially adapted for the connections between houses and the street-mains, to be shut off and locked by the water companies, when desired, or for supply-cocks to any part of a building, or to any part of an apparatus in a manufactory. It is possible by applying a seal after the cock is adjusted to make it impossible to be opened without detection, and without a seal it will offer so much difficulty that it will be usually a sufficient safeguard against tampering.

The following is a description of what I consider the best means of carrying out the invention.

The accompanying drawings form a part of this specification.

Figure 1:
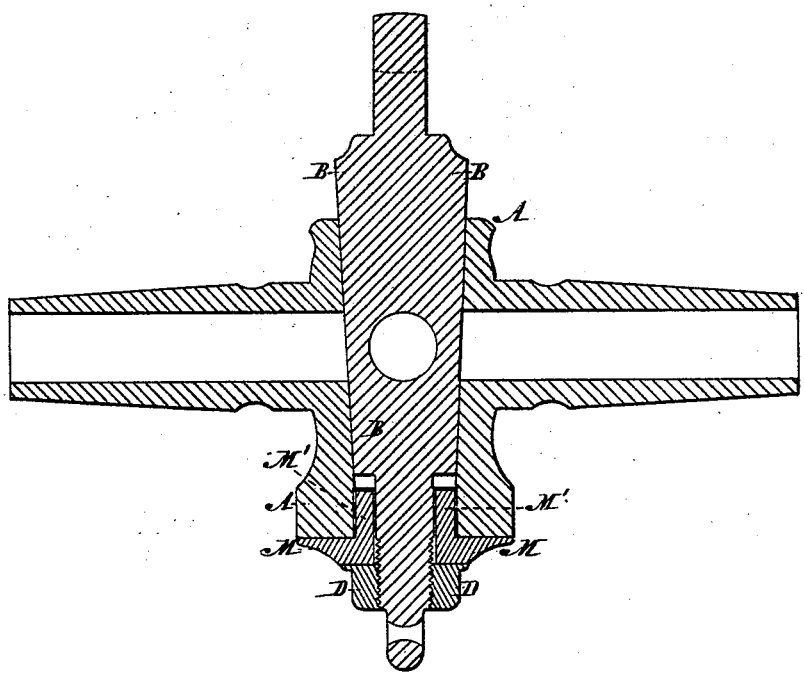
Figure 2:
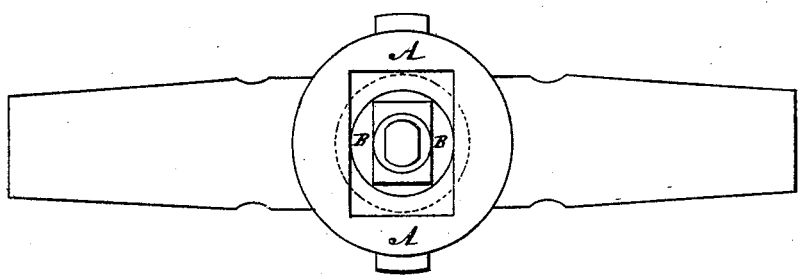
Figure 3:
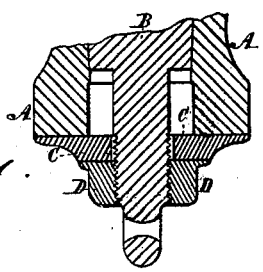

Figure 1 is a central longitudinal section, locked. Fig. 2 is a view from below, with the washer and nut removed; (in this condition it is neither adapted for use locked or unlocked;) and Fig. 3 is a section of the lower and novel portion adjusted, with an ordinary washer for use unlocked.

Similar letters of reference indicate corresponding parts in all the figures.

A is the body of the cock, which may be of any ordinary materials, and formed in an ordinary manner, excepting that a deep rectangular recess is formed around the part which receives the small end of the plug or turned part B. The latter is formed in the ordinary manner, excepting that the small end is squared or made of rectangular section to an extent equal to the squaring of the hole in the main body A, and a little greater.

When the cock is adjusted for use, an ordinary washer, C, is applied, and the nut fitted upon the threaded end of the plug, in the ordinary manner. The plug may, under these conditions, be turned into any position, and the squaring of a portion of the plug and the squared recess around it is of no effect.

When it is desired to lock the cock, the plug is turned into the closed position, and the nut D and washer C removed. There is then applied the peculiarly-constructed washer M, which is squared or made of angular section, so as to match exactly or approximately with the squared surface, before described—that is to say, the outer surface of the part M M' matches into the rectangular recess in the body A, and the inner surface of the part M' matches to the rectangular part of the plug. After this washer M with its extension M' is properly in place the nut D is again applied to secure it. When all is adjusted the cock presents the same appearance as before, but it is impossible to turn the plug.

An advantage due to this construction is that the plug is held very strongly, so that no amount of violence can possibly turn it. Furthermore, the adjustment is very quickly made.

In case unauthorized parties should go to the trouble of removing the nut D and the washers M M' there is no means of holding the cock properly in the absence of the proper washer C.

By making the nut D sufficiently large it is possible to dispense with the ordinary washer C and with the main part M of the removable locking washer. It is essential only that the locking part M' be inserted and removed, and that it matches around the angular portion of the stem and locks it relatively to the body A by filling the cavity.

The end of the plug B which projects beyond the nut D is preferably prepared with a transverse hole adapted to receive a padlock or seal for the convenience of further securing the lock by such means, when desired.

The invention may be used with or without such addition in a great variety of situations, but is more particularly intended for water-cocks and gas-cocks, controlling the connections from the street-mains.

I claim—

In combination with the body A, plug B, and confining means D, the removable locking piece M M', matching to an angular portion of the plug, and to an angular recess in the body A, so as to serve therewith, as and for the purposes herein specified.

In testimony whereof I have hereunto set my hand this 7th day of May, 1873, in the presence of two subscribing witnesses.

JAMES W. BIRKETT.

Witnesses:
 WM. C. DEY,
 ARNOLD HÖRMANN.